United States Patent
Li et al.

(10) Patent No.: US 12,333,625 B2
(45) Date of Patent: Jun. 17, 2025

(54) NEURAL NETWORK TRAINING WITH ACCELERATION

(71) Applicant: Samsung Electronics Co., Ltd., Suwon-si (KR)

(72) Inventors: Shiyu Li, Durham, NC (US); Krishna T. Malladi, San Jose, CA (US); Andrew Chang, Los Altos, CA (US); Yang Seok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 150 days.

(21) Appl. No.: 17/668,345

(22) Filed: Feb. 9, 2022

(65) Prior Publication Data
US 2023/0146611 A1    May 11, 2023

Related U.S. Application Data

(60) Provisional application No. 63/278,799, filed on Nov. 12, 2021, provisional application No. 63/278,381, filed on Nov. 11, 2021.

(51) Int. Cl.
*G06T 1/20* (2006.01)
*G06F 9/30* (2018.01)
(Continued)

(52) U.S. Cl.
CPC ............ *G06T 1/20* (2013.01); *G06F 9/30036* (2013.01); *G06F 18/2148* (2023.01); *G06T 1/60* (2013.01)

(58) Field of Classification Search
CPC ......... G06T 1/20; G06T 1/60; G06F 9/30036; G06N 3/08; G06N 3/0454; G06N 3/063;
(Continued)

(56) References Cited

U.S. PATENT DOCUMENTS

| 5,842,031 A | 11/1998 | Barker et al. |
| 6,356,983 B1 | 3/2002 | Parks |

(Continued)

FOREIGN PATENT DOCUMENTS

| CN | 106469020 B | 8/2019 |
| CN | 107092625 B | 10/2020 |

(Continued)

OTHER PUBLICATIONS

Acun, B. et al. "Understanding Training Efficiency of Deep Learning Recommendation Models at Scale", Nov. 11, 2020, pp. 1-13, https://arxiv.org/abs/2011.05497.

(Continued)

*Primary Examiner* — Jin Cheng Wang
(74) *Attorney, Agent, or Firm* — Lewis Roca Rothgerber Christie LLP

(57) ABSTRACT

A system and method for training a neural network. In some embodiments, the system includes a computational storage device including a backing store. The computational storage device may be configured to: store, in the backing store, an embedding table for a neural network embedding operation; receive a first index vector including a first index and a second index; retrieve, from the backing store: a first row of the embedding table, corresponding to the first index, and a second row of the embedding table, corresponding to the second index; and calculate a first embedded vector based on the first row and the second row.

20 Claims, 14 Drawing Sheets

(51) Int. Cl.
*G06F 18/214* (2023.01)
*G06T 1/60* (2006.01)

(58) Field of Classification Search
CPC ........ G06N 20/10; G06N 3/04; G06N 3/0445; G06N 3/0481; G06N 7/005; G06K 9/6276; G06K 9/6215; G06K 9/6251
See application file for complete search history.

(56) References Cited

U.S. PATENT DOCUMENTS

| | | |
|---|---|---|
| 6,631,448 B2 | 10/2003 | Weber |
| 7,073,030 B2 | 7/2006 | Azevedo et al. |
| 7,124,254 B2 | 10/2006 | Fahs et al. |
| 7,774,578 B2 | 8/2010 | Keltcher |
| 9,298,624 B2 | 3/2016 | Ren et al. |
| 9,501,410 B2 | 11/2016 | Kalekar et al. |
| 9,507,731 B1 | 11/2016 | Zheng et al. |
| 9,620,181 B2 | 4/2017 | Li et al. |
| 9,658,981 B2 | 5/2017 | Rossetti |
| 9,753,858 B2 | 9/2017 | Loh et al. |
| 10,095,740 B2 | 10/2018 | Bastide et al. |
| 10,255,181 B2 | 4/2019 | Turner et al. |
| 10,402,336 B2 | 9/2019 | Akin et al. |
| 10,468,118 B2 | 11/2019 | Walton et al. |
| 10,503,641 B2 | 12/2019 | Boyer et al. |
| 10,558,571 B2 | 2/2020 | McClements et al. |
| 10,664,462 B2 | 5/2020 | Gurajada et al. |
| 10,838,865 B2 | 11/2020 | Leidel et al. |
| 10,983,670 B2 | 4/2021 | Boucher et al. |
| 10,997,219 B1* | 5/2021 | Han ...................... G06F 16/285 |
| 11,651,209 B1* | 5/2023 | Nagarajan ............... G06N 3/063 706/25 |
| 2014/0177347 A1 | 6/2014 | Chatterjee et al. |
| 2015/0058524 A1 | 2/2015 | Creta et al. |
| 2016/0210231 A1 | 7/2016 | Huang et al. |
| 2017/0315742 A1* | 11/2017 | Christiansen ......... G06F 12/109 |
| 2018/0150143 A1 | 5/2018 | Orr et al. |
| 2019/0073580 A1 | 3/2019 | Dzhulgakov et al. |
| 2019/0121710 A1* | 4/2019 | Bulusu ................ G06F 11/1666 |
| 2019/0163557 A1* | 5/2019 | Nguyen ............... G11C 29/883 |
| 2020/0089613 A1 | 3/2020 | Li et al. |
| 2020/0294182 A1 | 9/2020 | George et al. |
| 2020/0311522 A1* | 10/2020 | Tzoufras ................ G06N 3/084 |
| 2021/0049469 A1 | 2/2021 | Weber et al. |
| 2021/0065047 A1 | 3/2021 | Shi et al. |
| 2021/0081129 A1 | 3/2021 | Tian |
| 2021/0133123 A1 | 5/2021 | Feehrer et al. |
| 2021/0149677 A1 | 5/2021 | Maiyuran et al. |
| 2021/0149680 A1 | 5/2021 | Hughes et al. |
| 2021/0150770 A1 | 5/2021 | Appu et al. |
| 2021/0191871 A1* | 6/2021 | Ke ...................... G06F 12/0875 |
| 2021/0192287 A1 | 6/2021 | Dwivedi et al. |
| 2021/0303978 A1* | 9/2021 | Nagarajan ............... G06N 3/084 |
| 2021/0311646 A1 | 10/2021 | Malladi et al. |
| 2021/0373788 A1* | 12/2021 | Martin .................. G06F 3/0646 |
| 2021/0382765 A1 | 12/2021 | Venkatesh et al. |
| 2022/0113915 A1 | 4/2022 | Ki et al. |
| 2022/0129272 A1 | 4/2022 | Wang et al. |
| 2022/0197530 A1* | 6/2022 | Rhee ........................ G06N 3/04 |
| 2022/0206958 A1 | 6/2022 | LeMay et al. |
| 2022/0222235 A1* | 7/2022 | Menghani ................ G06N 3/04 |
| 2022/0318144 A1* | 10/2022 | Bajic .................. G06F 11/3466 |
| 2022/0318614 A1* | 10/2022 | Bajic ..................... G06F 9/3877 |
| 2022/0342569 A1* | 10/2022 | Sim ........................ G06N 3/045 |
| 2022/0405580 A1* | 12/2022 | Zheng ............... G06F 18/24147 |
| 2023/0065546 A1* | 3/2023 | Ibrahim .................. G06F 16/27 |
| 2023/0090284 A1* | 3/2023 | Hazel ..................... G06F 3/0673 |
| 2024/0037378 A1 | 2/2024 | Ma et al. |
| 2024/0104136 A1* | 3/2024 | Karlsson ............. G06F 16/9024 |

FOREIGN PATENT DOCUMENTS

| | | |
|---|---|---|
| EP | 3304311 B1 | 8/2019 |
| WO | WO 2015/051488 A1 | 4/2015 |
| WO | WO 2016/195841 A1 | 12/2016 |
| WO | 2021/067376 A1 | 4/2021 |

OTHER PUBLICATIONS

Gowanlock, M. et al., "A Hybrid Approach for Optimizing Parallel Clustering Throughput using the GPU", IEEE Transactions on Parallel and Distributed Systems, Apr. 2019, pp. 766-777, vol. 30, No. 4, IEEE.

Gupta, U. et al. "The Architectural Implications of Facebook's DNN-based Personalized Recommendation", Feb. 15, 2020, pp. 1-14, https://arxiv.org/pdf/1906.03109.pdf.

Hwang, R. et al. "Centaur: A Chiplet-based, Hybrid Sparse-Dense Accelerator for Personalized Recommendations", May 12, 2020, 14 pages, https://arxiv.org/abs/2005.05968.

Karantasis, K. et al., "Accelerating Data Clustering on GPU-based Clusters under Shared Memory Abstraction", Sep. 2010, 6 pages, IEEE.

Ke, L. et al., "RecNMP: Accelerating Personalized Recommendation with Near-Memory Processing", Dec. 30, 2019, pp. 1-14, https://arxiv.org/abs/1912.12953.

Mudigere, D. et al., "Software-Hardware Co-design for Fast and Scalable Training of Deep Learning Recommendation Models", Apr. 27, 2022, 19 pages, https://arxiv.org/abs/2104.05158.

Naumov, M. et al., "Deep Learning Recommendation Model for Personalization and Recommendation Systems", May 31, 2019, pp. 1-10, https://arxiv.org/abs/1906.00091.

U.S. Appl. No. 17/670,044, filed Feb. 11, 2022.

Ardestani, Ehsan K., et al., "Supporting Massive DLRM Inference Through Software Defined Memory," arxiv.org, Cornell University Library, Nov. 2021, 14 pages.

Wang, David, "Innovations in Memory System Architecture: PIM and CXL Memory," OCP Future Technologies Symposium, OCP Global Summit, Nov. 8, 2021, 21 pages, Retrieved from the Internet: URL: https://146a55aca6f00848c565-a7635525d40ac1c70300198708936b4e.ssl.cf1.rackcdn.com/images/a075582b22c2e370455af4ce038f3fa38ae337e3.pdf.

EPO Extended European Search Report dated Mar. 7, 2023, issued in European Patent Application No. 22198011.3 (10 pages).

EPO Extended European Search Report dated Mar. 16, 2023, issued in corresponding European Patent Application No. 22205992.5 (9 pages).

US Office Action dated Apr. 11, 2024, issued in U.S. Appl. No. 17/670,044 (16 pages).

US Notice of Allowance dated Aug. 28, 2024, issued in U.S. Appl. No. 17/670,044 (9 pages).

Korean Office Action dated Sep. 6, 2024, issued in corresponding Korean Patent Application No. 10-2022-0125169 (6 pages).

* cited by examiner

NEURAL NETWORK TRAINING WITH ACCELERATION

CROSS-REFERENCE TO RELATED APPLICATION(S)

The present application claims priority to and the benefit of U.S. Provisional Application No. 63/278,381, filed Nov. 11, 2021, entitled "NEAR STORAGE ACCELERATION OF THE PERSONALIZED RECOMMENDATION MODEL TRAINING", and the present application claims priority to and the benefit of U.S. Provisional Application No. 63/278,799, filed Nov. 12, 2021, entitled "FPGA-BASED EMBEDDING FOR PERSONALIZED RECOMMENDATION MODEL TRAINING"; the entire contents of both of the provisional applications identified in this paragraph are incorporated herein by reference.

FIELD

One or more aspects of embodiments according to the present disclosure relate to neural networks, and more particularly to a system and method for training a neural network.

BACKGROUND

Neural network training operations may be computationally burdensome, and different aspects of such operations may place different demands on a system for training. For example, in a neural network that receives a first set of inputs that are continuous and a second set of inputs that are categorical, the processing of the latter may be performed with an embedding operation, which may require a large amount of storage.

Thus, there is a need for a system and method for training a neural network.

SUMMARY

In some embodiments, a system for performing neural network training includes a graphics processing unit (GPU) cluster and a computational storage system. The neural network may include a bottom multilayer perceptron, a top multilayer perceptron, and one or more embedding tables. The bottom multilayer perceptron may process continuous inputs, and the embedding tables may process categorical inputs. The outputs of the bottom multilayer perceptron and of the embedding tables may be combined and further processed in the top multilayer perceptron to produce an output such as a predicted click-through rate.

The bottom multilayer perceptron and the top multilayer perceptron may be implemented in the GPU system, and the embedding tables may be implemented in the computational storage system. The computational storage system may include a plurality of computational storage devices, each of which may expose a portion of a respective random access memory, for communication between the computational storage device and (i) the GPU system and (ii) a host which may manage the training operation.

The computational storage system may, in a process which may be referred to as "speculative recovery", calculate embedded vectors without waiting for the embedding tables to be updated (based on a gradient calculated during the preceding pass). The computational storage system may then update the calculated embedded vectors based on the gradient. This approach may result in a reduction in processing time.

According to an embodiment of the present disclosure, there is provided a system, including: a computational storage device including a backing store, wherein the computational storage device is configured to: store, in the backing store, an embedding table for a neural network embedding operation; receive a first index vector including a first index and a second index; retrieve, from the backing store: a first row of the embedding table, corresponding to the first index, and a second row of the embedding table, corresponding to the second index; and calculate a first embedded vector based on the first row and the second row.

In some embodiments, the system further includes a graphics processing unit, wherein: the computational storage device further includes a memory; and the computational storage device is further configured to expose a portion of the memory for access by the graphics processing unit.

In some embodiments: the computational storage device is further configured to store the first embedded vector in the portion of the memory; and the graphics processing unit is configured to read the first embedded vector from the portion of the memory.

In some embodiments, the computational storage device is further configured to: receive a gradient vector; and update a row of the embedding table based on the gradient vector to form an updated row.

In some embodiments, the computational storage device is further configured to update the first embedded vector, based on the gradient vector, to form an updated first embedded vector.

In some embodiments, the updating of the first embedded vector includes: calculating an overlap count, the overlap count being a count of elements present both in the first index vector and in a previous batch of index vectors.

In some embodiments, the calculating of the first embedded vector includes summing the first row and the second row.

In some embodiments, the updating of the first embedded vector further includes adding to the first embedded vector the product of: the overlap count, the gradient vector, and a learning rate.

In some embodiments: a second index vector includes the first index; and the computational storage device is further configured to: store the first row in a cache of the computational storage device, and calculate a second embedded vector based on the first row.

According to an embodiment of the present disclosure, there is provided a method, including: storing, by a computational storage device, in a backing store of the computational storage device, an embedding table for a neural network embedding operation; receiving, by the computational storage device, a first index vector including a first index and a second index; retrieving, by the computational storage device, from the backing store, to a first cache of the computational storage device: a first row of the embedding table, corresponding to the first index, and a second row of the embedding table, corresponding to the second index; and calculating, by the computational storage device, a first embedded vector based on the first row and the second row.

In some embodiments, the method further includes: receiving a gradient vector; and updating a row of the embedding table based on the gradient vector to form an updated row.

In some embodiments, the method further includes updating the first embedded vector, based on the gradient vector, to form an updated first embedded vector.

In some embodiments, the updating of the first embedded vector includes: calculating an overlap count, the overlap count being a count of elements present both in the first index vector and in a previous batch of index vectors.

In some embodiments, the calculating of the first embedded vector includes summing the first row and the second row.

In some embodiments, the updating of the first embedded vector further includes adding to the first embedded vector the product of: the overlap count, the gradient vector, and a learning rate.

In some embodiments, the method further includes storing the updated first embedded vector in a second cache.

In some embodiments: a second index vector includes the first index; and the method further includes: storing the first row in the first cache, and calculating a second embedded vector based on the first row.

In some embodiments, the method further includes storing the updated row in the backing store.

According to an embodiment of the present disclosure, there is provided a system, including: a computational storage device including: means for processing; a first cache; and a backing store, wherein the means for processing is configured to: store, in the backing store, an embedding table for a neural network embedding operation; receive a first index vector including a first index and a second index; retrieve, from the backing store, to the first cache: a first row of the embedding table, corresponding to the first index, and a second row of the embedding table, corresponding to the second index; and calculate a first embedded vector based on the first row and the second row.

In some embodiments, the means for processing is further configured to: receive a gradient vector; and update a row of the embedding table based on the gradient vector.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
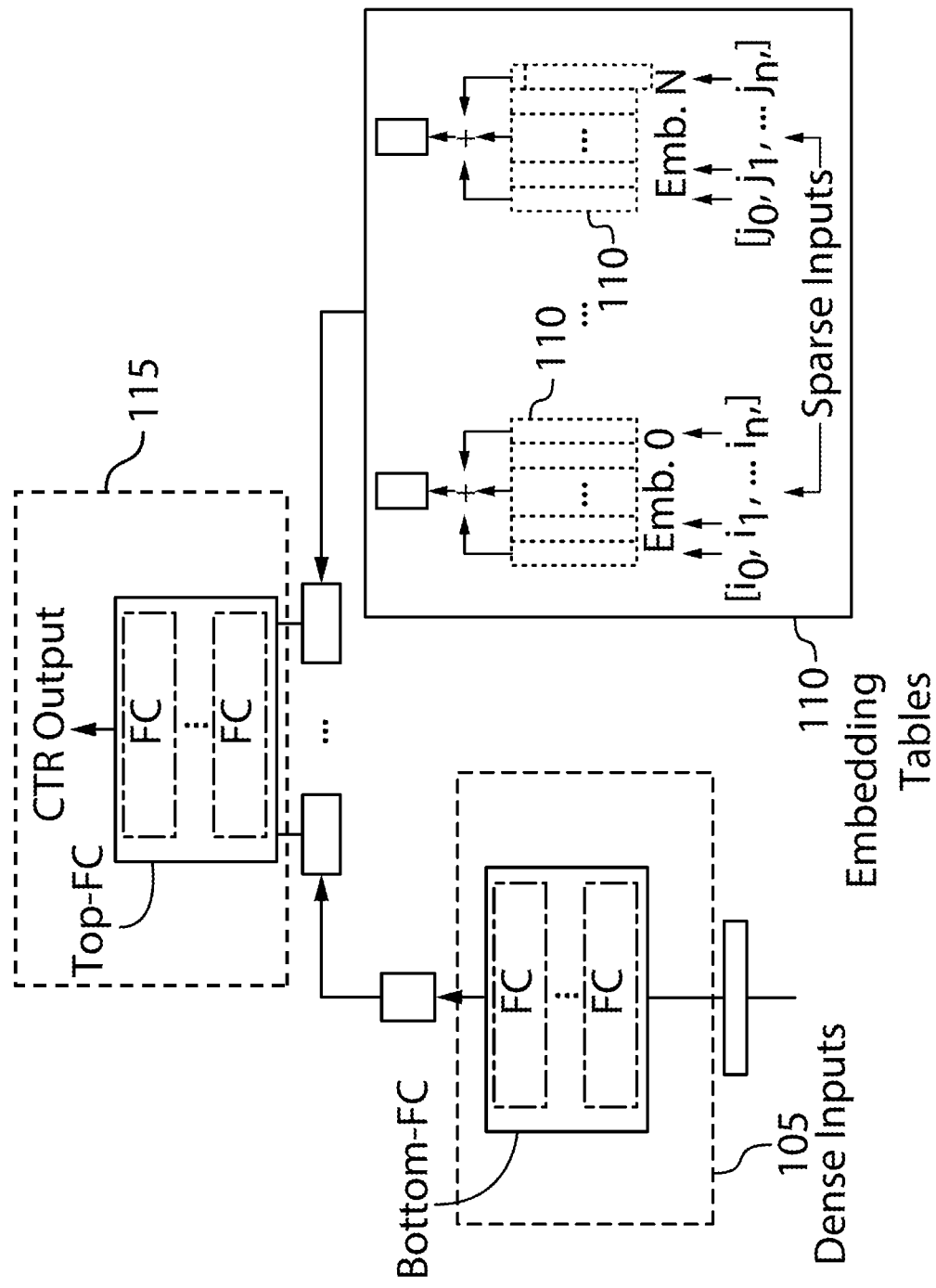
FIG. 1A is a functional block diagram of a neural network, according to an embodiment of the present disclosure.

The detailed description set forth below in connection with the appended drawings is intended as a description of exemplary embodiments of a system and method for training a neural network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, a system for performing neural network training includes a graphics processing unit (GPU) system and a computational storage system. The GPU system (which may also be referred to as a "GPU cluster") may include a single GPU or a plurality of GPUs. The computational storage system (which may also be referred to as a "computational storage cluster") may include a single computational storage device or a plurality of computational storage devices. The neural network may include a bottom multilayer perceptron, a top multilayer perceptron, and one or more embedding tables. The bottom multilayer perceptron may process continuous inputs, and the embedding tables may process categorical inputs. The outputs of the bottom multilayer perceptron and of the embedding tables may be combined and further processed in the top multilayer perceptron to produce an output.

The bottom multilayer perceptron and the top multilayer perceptron may be implemented in the GPU system, and the embedding tables may be implemented in the computational storage system. The computational storage system may include a plurality of computational storage devices, each of which may expose a portion of a respective memory (e.g., a dynamic random access memory), for communication between the computational storage device and (i) the GPU system and (ii) a host which may manage the training operation. The computational storage system may calculate embedded vectors without waiting for the embedding tables to be updated (based on a gradient calculated during the preceding pass). The computational storage system may then update the calculated embedded vectors based on the gradient. This approach may result in a reduction in processing time.

FIG. 1 shows a neural network. In some embodiments, such a neural network, which may be a deep learning recommendation model (DLRM) may include a bottom multi-layer perceptron (MLP) 105, one or more embedding tables 110, and a top multi-layer perceptron (MLP) 115. Each multi-layer perceptron may include a plurality of fully connected (FC) layers. Such a neural network may be well suited to learning a user's preferences and making recommendations to the user, based on those preferences, and on the preferences of other users. Training such a neural network may include performing a number of training iterations, each of which may include performing a forward pass to calculate a value of the cost function for a given set of weights, calculating one or more gradients (of the cost function with respect to the weights), and updating the weights based on the gradient and based on a learning rate.

In operation (both for inference and for forward passes during training), the neural network may receive both dense (continuous) and sparse (categorical) inputs. The dense inputs may be processed with the bottom multi-layer perceptron 105, and sparse features may be processed with an embedding operation, e.g., with the embedding tables 110. The sparse inputs may be vectors of indices (i.e., vectors the elements of which include (e.g., are) indices), each index identifying a row of an embedding matrix. The embedding operation, for one sparse input vector, may include (e.g., consist of) retrieving the rows identified by the indices of the sparse input vector, and calculating the sum of the rows, to form a vector that may be referred to as an "embedded vector". The outputs of the bottom multi-layer perceptron 105 and of the embedding tables 110 may be combined in a feature interaction function and fed to the top multi-layer perceptron 115, which generates the output of the neural network (e.g., a predicted click-through rate (CTR)).

Figure 1B:
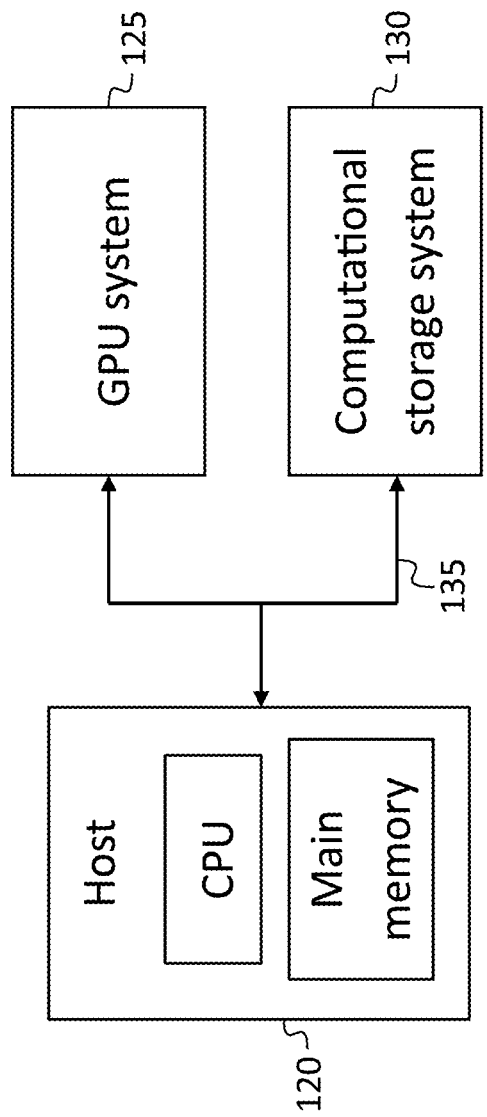
FIG. 1B is a structural block diagram of a neural network, according to an embodiment of the present disclosure.

Referring to FIG. 1B, the neural network may be implemented on a system including a host 120 (which includes a central processing unit (CPU) and a main memory) connected to a graphics processing unit (GPU) cluster 125 and to a computational storage system 130 through a system interconnect 135 (which may be a cache coherent system interconnect, e.g., a Compute Express Link (CXL) interconnect). The computational storage system 130 may store the embedding matrices and perform the embedding operation, and the GPU system 125 may implement the bottom multi-layer perceptron 105 and the top multi-layer perceptron 115. The host 120 may manage the operation of the computational storage system 130 and of the GPU system 125.

Figure 1C:
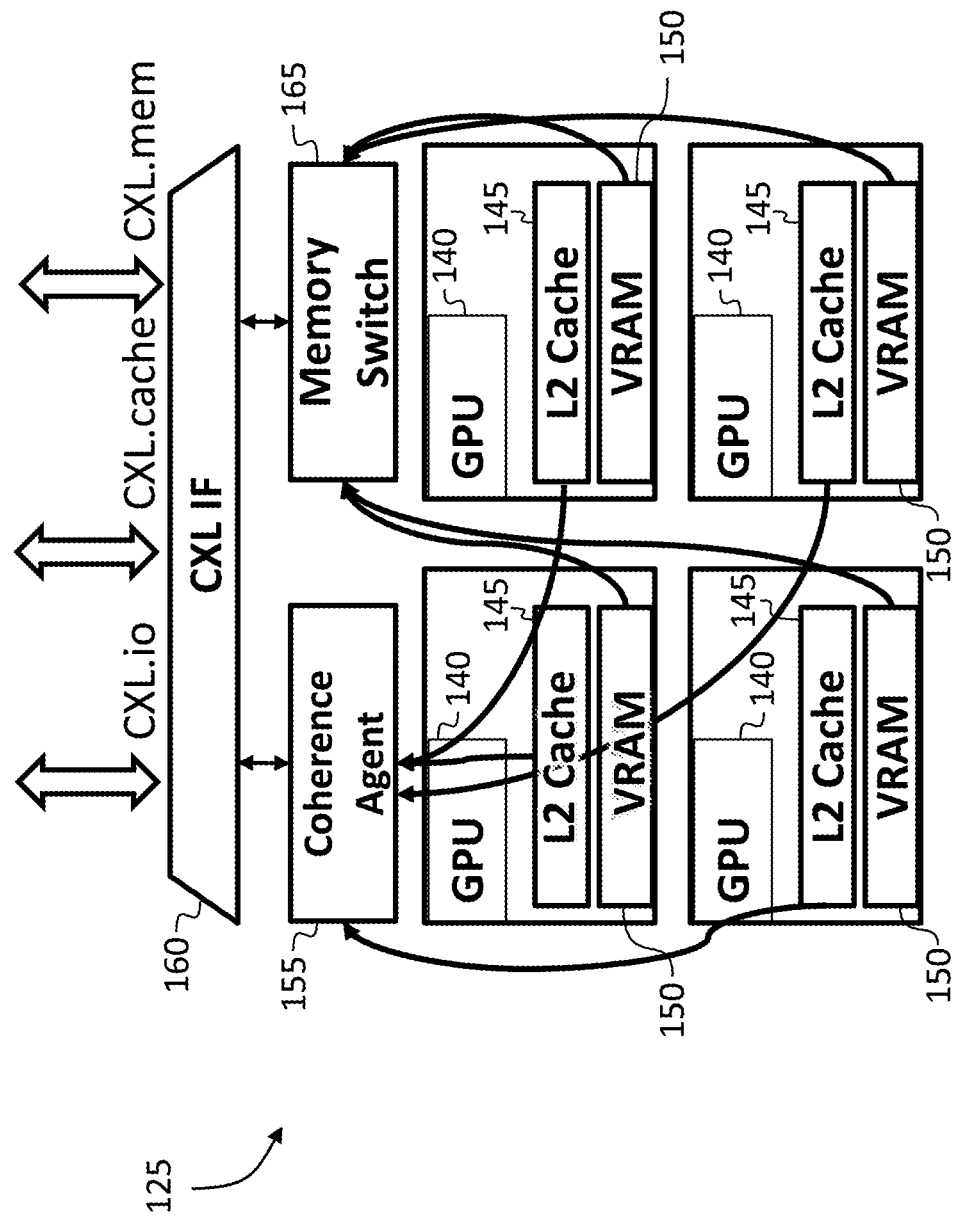
FIG. 1C is a block diagram of a GPU system, according to an embodiment of the present disclosure.

FIG. 1C shows an example of a GPU system 125, in some embodiments. The GPU system 125 is illustrated as including four GPUs 140 for ease of illustration; in some embodiments the GPU system may include more or fewer GPUs, e.g., it may include between 2 and 8 GPUs. Each GPU 140 may have an associated level 2 (L2) cache 145 and an associated video random access memory (VRAM) 150. Each GPU may be a circuit designed to create images in a frame buffer, or it may be any other suitable circuit for performing neural network computations, and, as used herein, the term "GPU" is synonymous with "processing circuit" and is used primarily to facilitate the distinguishing of the processing circuits in the GPU system 125 and the processing circuits in the computational storage system 130. All of the level 2 caches 145 may be connected to a coherence agent 155 which may be connected to the system interconnect 135 through a system interconnect interface controller 160 (which may be a CXL interface). The coherence agent may be any suitable combination of hardware and software configured to ensure cache coherence of the level 2 caches 145. The GPU system 125 may have a high bandwidth internal bus. Each of the VRAMs 150 may be connected, through a memory switch 165 and through the system interconnect interface controller 160, to the system interconnect 135. The system interconnect interface controller 160 of the GPU system 125 may support a cache protocol and a memory protocol.

Figure 1D:
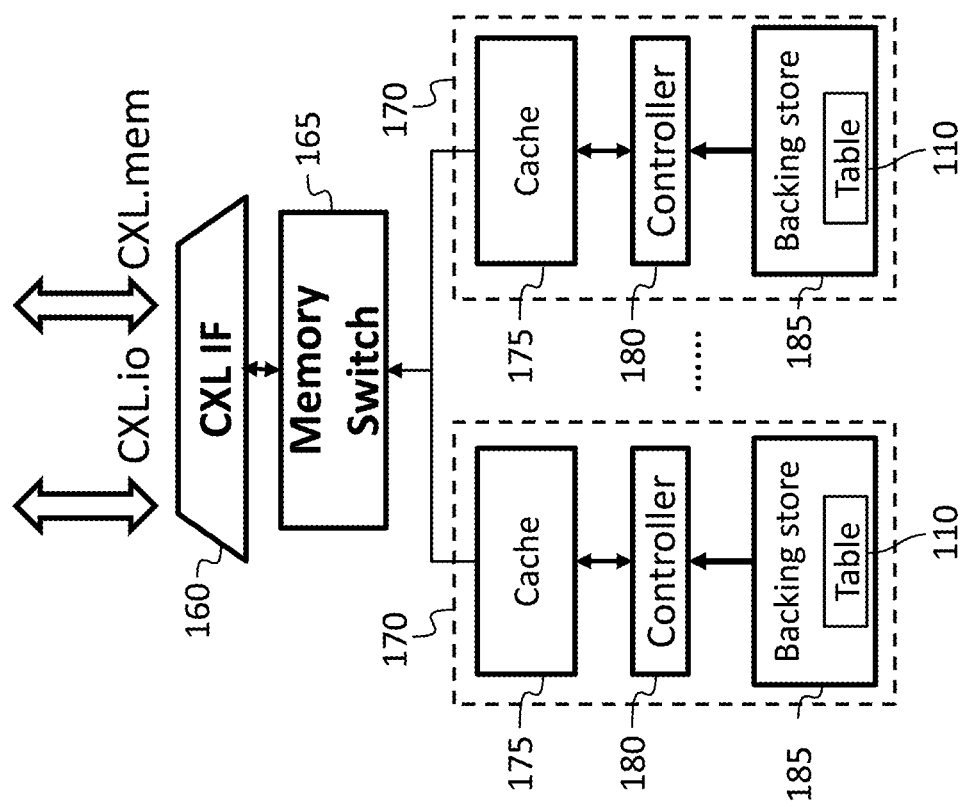
FIG. 1D is a block diagram of a computational storage system, according to an embodiment of the present disclosure.

FIG. 1D shows an example of a computational storage system 130 in some embodiments. The computational storage system 130 includes a plurality of computational storage devices 170, of which two are explicitly illustrated in FIG. 1D. Each of the computational storage devices 170 may include a cache 175 (e.g., a dynamic random access memory (DRAM) cache), a controller 180 (e.g., a field programmable gate array (FPGA) or an application-specific integrated circuit (ASIC)), and a backing store 185 (which may be persistent storage, e.g., a solid state drive (SSD)). Each of the computational storage devices 170 may be connected to the system interconnect 135 through a memory switch 165 and through a system interconnect interface controller 160 as shown. In embodiments in which the system interconnect 135 is a CXL interconnect, each of the computational storage devices 170 may be configured as a CXL Type-3 device, directly connected, (if the system interconnect 135 is a CXL interconnect), through the CXL.io port. The system interconnect interface controller 160 of the computational storage system 130 may support a memory protocol. The embedding tables may be relatively large (e.g., 100 GB each) and they may not readily fit into the storage (e.g., the VRAM 150) of a GPU 140. As such, the embedding tables 110 may be stored in the backing stores 185 of the computational storage devices 170 as shown.

Figure 1E:
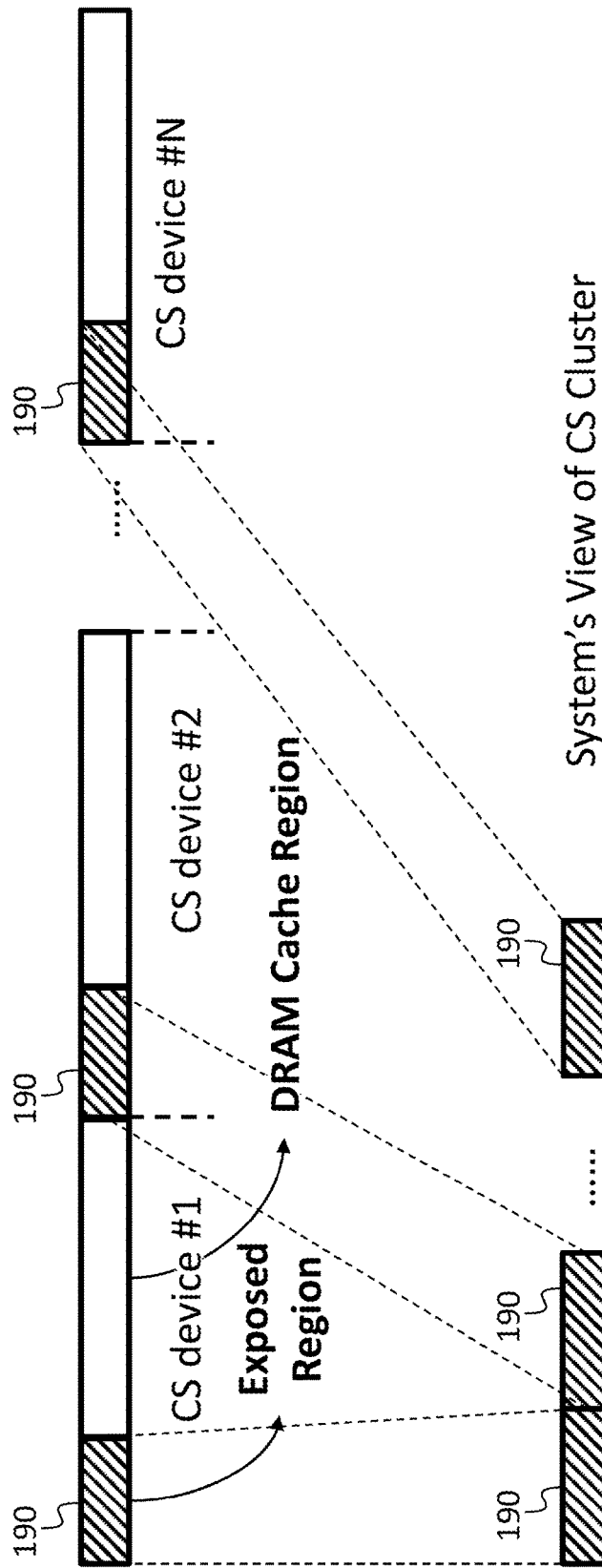
FIG. 1E is a memory organization diagram, according to an embodiment of the present disclosure.

Communication (from the GPUs and the host) with the computational storage system 130 may be conducted via the caches 175 of the computational storage devices 170. As shown in FIG. 1E, each of the computational storage devices 170 may expose a portion 190 (e.g., between 1% and 50%) of the cache 175 of the computational storage device 170, so that the host 120 and each of the GPUs 140 may be able to read directly from the exposed portions and write directly to the exposed portions 190 of the caches 175 of the computational storage devices 170.

Figure 1F:
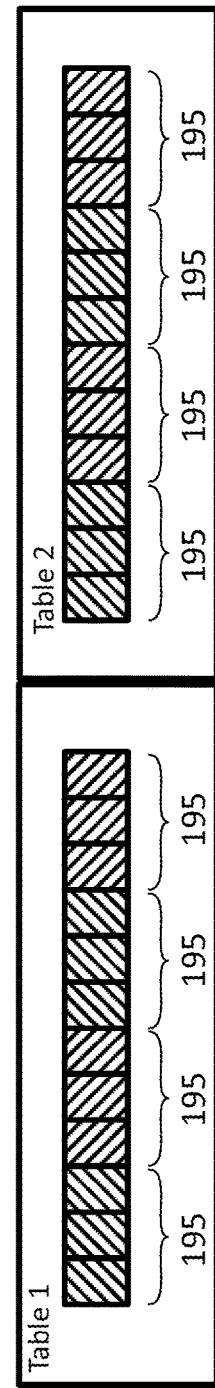
FIG. 1F is a data layout diagram, according to an embodiment of the present disclosure.

The size of each of the exposed portions 190 of the caches 175 of the computational storage devices 170 may be selected to be equal to the product of (i) the number of outstanding embeddings (i.e., the number of embedded vectors calculated before a GPU 140 reads them), (ii) the length of the embedded vectors, (iii) the number of embedding tables, and (iv) the batch size (where training is performed in batches). From the system perspective, the computational storage system 130 may appear as a single contiguous region of memory, with a plurality of contiguous portions each being the exposed portion 190 of the caches 175 of one of the computational storage devices 170. FIG. 1F shows the data layout, with, for example, embedded vectors 195 for a first table (Table 1) being stored in a first set of contiguous regions of the exposed memory and embedded vectors 195 for a second table (Table 2) being stored in a second set of contiguous regions of the exposed memory, contiguous with the first set.

In operation, the embedded vectors calculated by the computational storage system 130 may be saved to the exposed portions 190 of the caches 175 of the computational storage devices 170 (e.g., in iteration-table-item order), and read from the exposed portions 190 of the caches 175 of the computational storage devices 170 by the GPUs 140. The use of a cache coherent system interconnect 135 may enable the GPUs to copy the embedded vectors directly to the level 2 caches 145 of the GPU system 125, without first copying them to the VRAM 150. This may significantly improve the efficiency of the system (e.g., it may significantly increase the speed and reduce the energy consumption per neural network operation). The GPU system 125 may operate in a data-parallel mode, and each GPU 140 may fetch, from exposed portion 190 of the caches 175 of one of the computational storage devices 170, and process, a respective subset of the embedded vectors produced by the computational storage system 130. The gradients (of the cost function with respect to the weights of the embedding tables 110), may be calculated by the top multi-layer perceptron 115 (which is implemented in the GPU system 125), and written, by the GPU system 125, to the exposed portions 190 of the caches 175 of the computational storage devices 170 by the GPUs 140. The controllers 180 of the computational storage devices 170 may then update the embedding tables 110 based on the gradients.

The level 2 caches 145 of the GPU system 125 may, as mentioned above, be connected to the coherence agent 155 of the GPU system 125, and able to directly cache data from the main memory of the host 120, or, as mentioned above, from the exposed portions 190 of the caches 175 of the computational storage devices 170. The VRAM 150 of each GPU 140 may be connected to the memory switch 165 of the GPU system 125; this memory switch may communicate with the system interconnect 135 through the CXL mem protocol, with the effect that all of the VRAM 150 of each GPU 140 may be exposed to the remainder of the system through the system interconnect 135. As such, the host 120 may be capable of directly writing the dense input features to the VRAMs 150 of the GPUs 140, and of reading the result from the VRAMs 150 of the GPUs 140.

In some embodiments, the training pipeline starts from the CPU of the host 120. Processing of the input data may be performed by the host 120, since this approach provides the flexibility to implement different shuffle and partition schemes. The host 120 may (i) notify a GPU 140 to fetch dense features directly from the host's main memory, and (ii) send the sparse features to the computational storage devices 170 through the input-output (io) protocol (e.g., through CXL.io). The computational storage device 170 may fetch corresponding rows from the backing store 185 to the cache 175 of the computational storage device 170 (if it is not already there), and load the rows that are used by the current iteration to an on-chip cache in the controller 180 (e.g., to a memory or buffer in the controller 180).

Figure 1G:
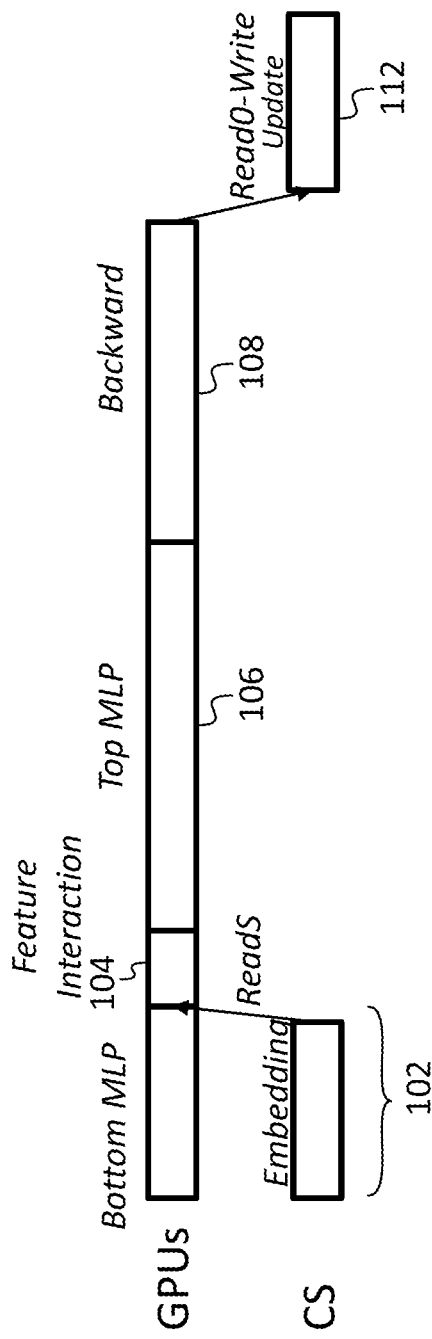
FIG. 1G is a diagram of a process flow, according to an embodiment of the present disclosure.

FIG. 1G shows a processing flow, in some embodiments. At 102, the bottom multi-layer perceptron 105 runs in the GPU system 125, and, concurrently, the embedding operation runs in the computational storage system 130. At 104, feature interaction combines (e.g., using vector dot products) the outputs of the bottom multi-layer perceptron 105 embedding operation to form inputs to the top multi-layer perceptron 115. At 106, the top multi-layer perceptron 115 runs in the GPU system 125; at 108, backward propagation is performed and a gradient is written back to the computational storage system 130, for use, at 112, in updating the embedding tables.

Figure 2A:
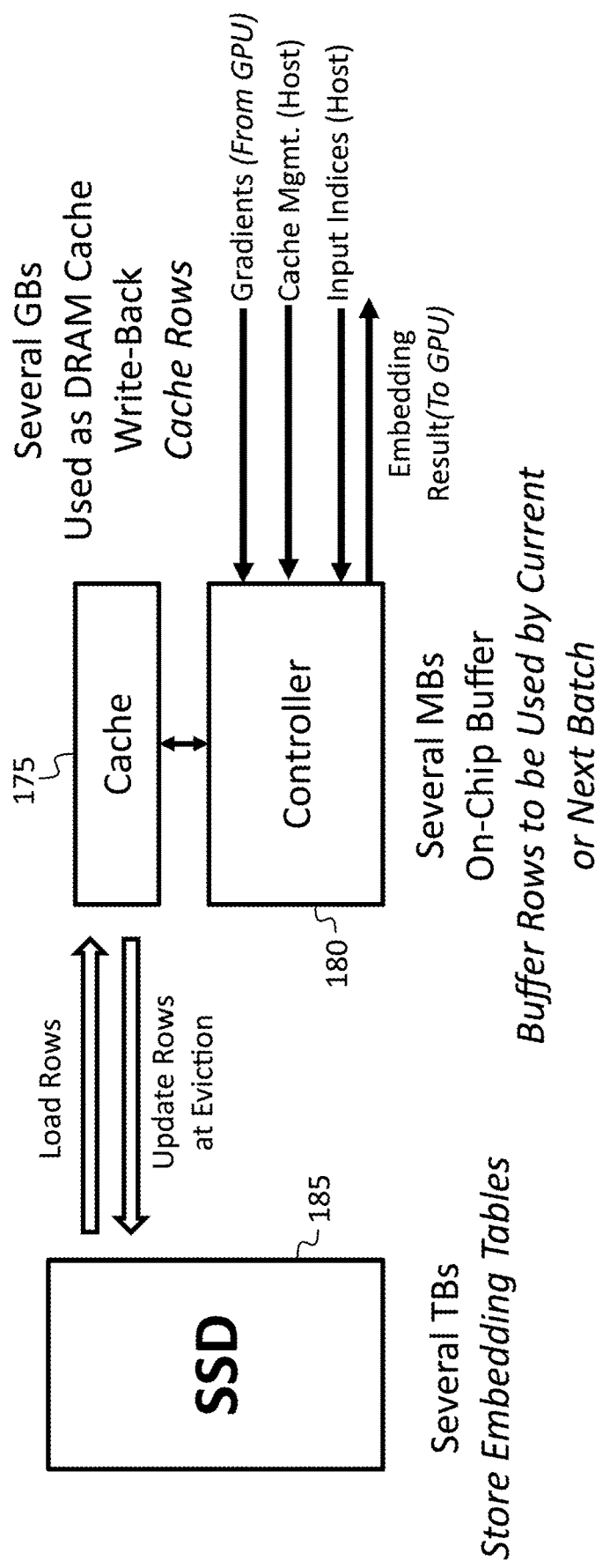
FIG. 2A is a structural block diagram of computational storage device, according to an embodiment of the present disclosure.

FIG. 2A shows the memory hierarchy that may be employed in a computational storage device 170, in some embodiments. The controller 180 (e.g., the FPGA) of the computational storage device 170 may include a level 1 cache, e.g., several megabytes (MB) of on-chip buffer. Further, the computational storage device 170 may include several gigabytes (GB) of dynamic random access memory (DRAM) which may operate as a level 2 cache 175 (which may also be referred to as the DRAM cache). The level 2 cache 175 may be managed by the host 120 and the on-chip buffer may be managed by the controller 180. Both levels of cache may be implemented as write-back caches, e.g., data may be written back (to the backing store from the level 2 cache, or to the level 2 cache from the level 1 cache) when it is evicted from a cache.

Figure 2B:
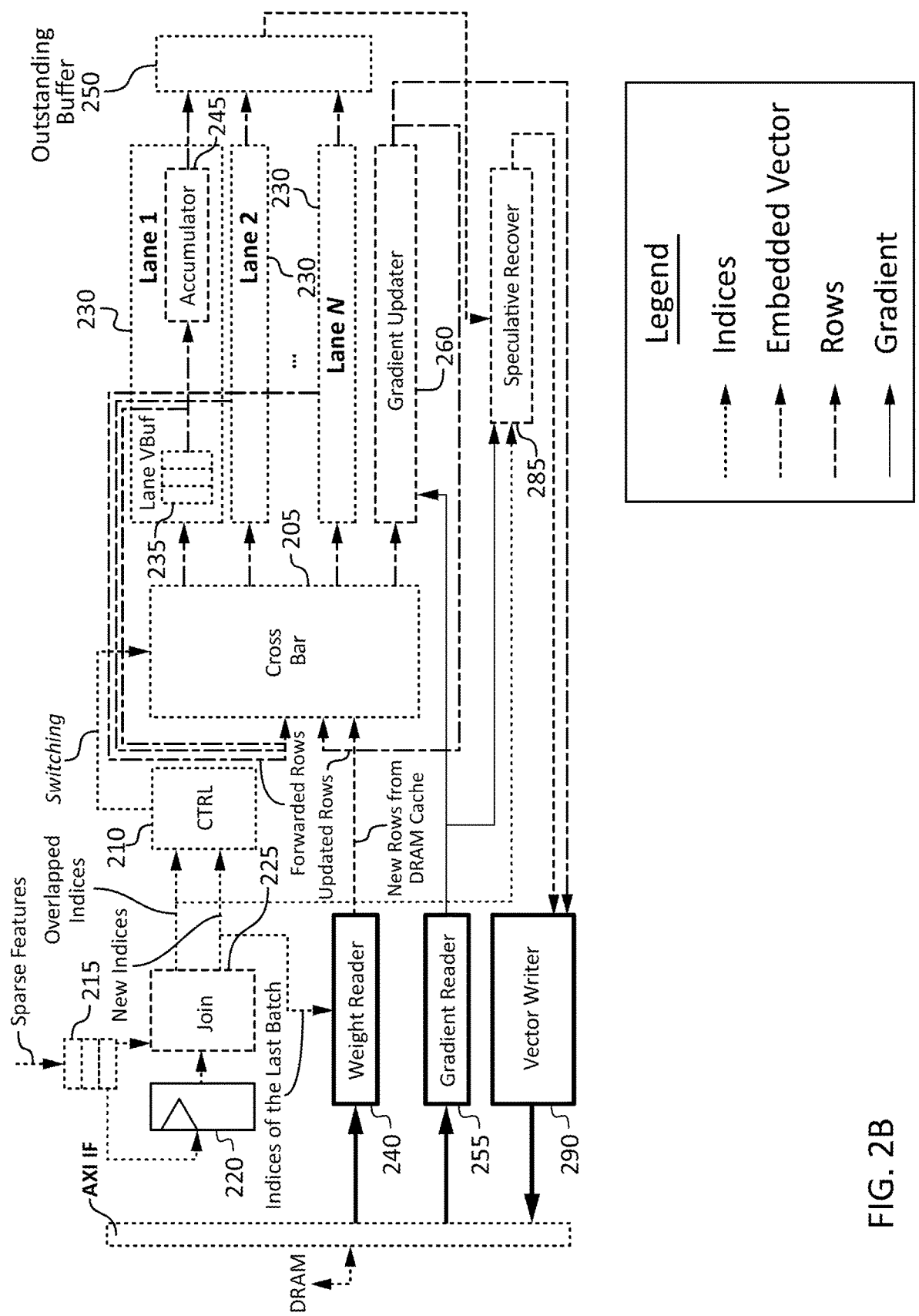
FIG. 2B is a block diagram of an embedding kernel, according to an embodiment of the present disclosure.

FIG. 2B shows the structure and process that may be implemented in the controller 180 of each computational storage device 170. This structure and process may also be referred to as the "embedding kernel". The embedding kernel may include a cross-bar switch 205 controlled by a switching controller 210. In operation, sparse input feature vectors are received from the host 120 and fed into an input first-in-first-out structure (FIFO) 215. The current input feature vector is compared to the previous input feature vector (which is stored in an input feature vector register 220) in a join circuit 225, which produces, (i) at a first output, the set of indices common to both the current input feature vector and the previous input feature vector, and, (ii) at a second output, the set of indices that are present in the current input feature vector and not in the previous input feature vector.

Each of the embedding tables 110 may be processed by a respective lane 230 of a plurality of lanes 230 (each of which may be one of a set of parallel, independent processing paths) connected to the cross-bar switch 205. The rows of the embedding table corresponding to the previous input feature vector may be saved in the on-chip buffer, which may be configured as a plurality of lane vector buffers (one of which, the lane buffer (Lane VBuf) 235 of the first lane (Lane 1), is explicitly illustrated in FIG. 2B). As such, the rows (of the embedding table) corresponding to the set of indices common to both the current input feature vector and the previous input feature vector need not be fetched from the level 2 cache 175 (or from the backing store 185); the remaining rows (i.e., the rows corresponding to the set of indices that are present in the current input feature vector and not in the previous input feature vector) are fetched (from the level 2 cache 175 or from the backing store 185) by a weight reading circuit 240 and fed to the cross-bar switch 205. In each lane, the sum of the selected rows is formed using a vector accumulator 245. The embedded vectors calculated in this manner are stored in an outstanding buffer 250 to await possible further processing to account for changes to the gradient, as discussed in further detail below.

Figure 2C:
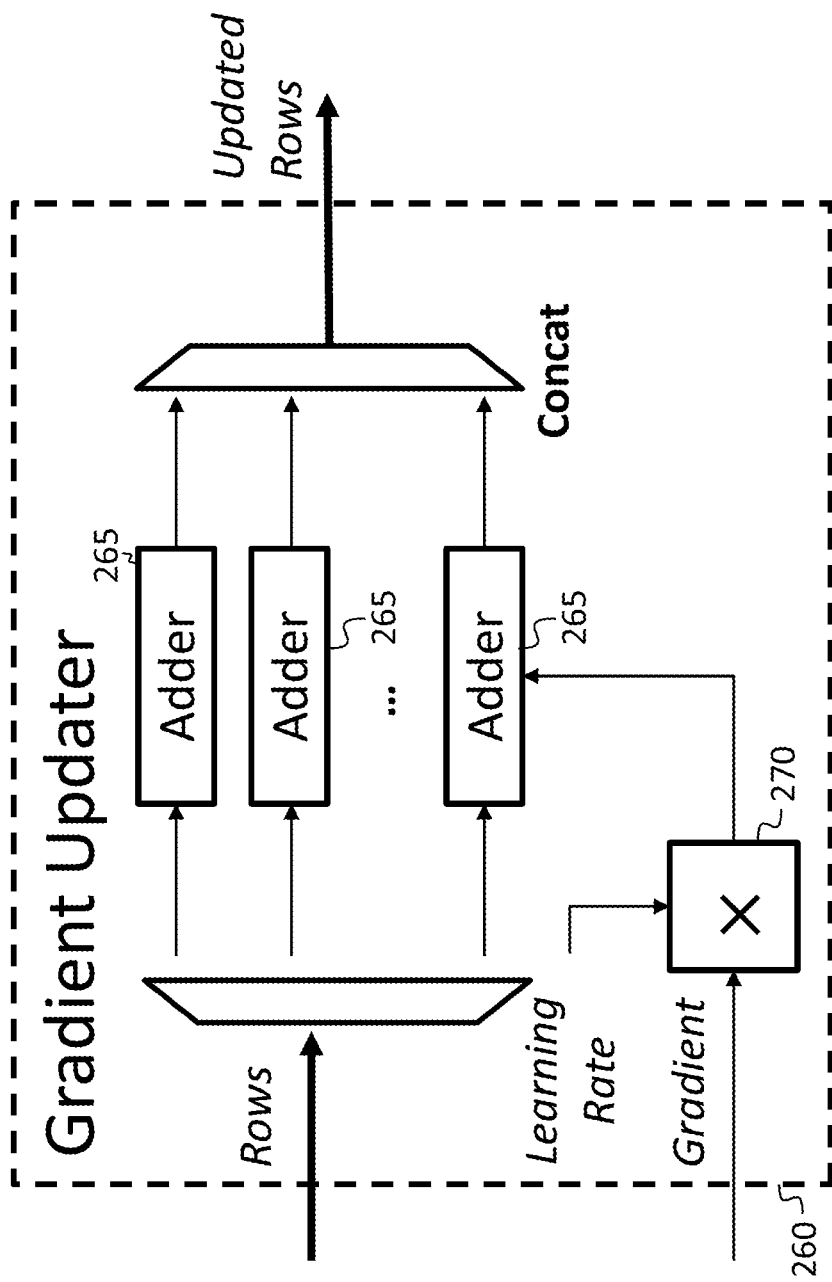
FIG. 2C is a block diagram of a gradient updating circuit, according to an embodiment of the present disclosure.

Updating of the weights based on the gradient may proceed as follows. The gradient may be read from the exposed portion 190 of the level 2 cache 175 of the computational storage device 170 (where it may have been stored by the GPU system 125) by a gradient reading circuit 255. The gradient may then be used, in a gradient updating circuit 260, to update the weights of any row (fed to the gradient updating circuit 260 by the cross-bar switch 205). Referring to FIG. 2C, this may be accomplished by adding (in an adder 265) to each row the product (formed in a multiplier 270) of the gradient and a learning rate. The gradients (of the cost function with respect to the weights of the embedding tables 110), may be calculated by the top multi-layer perceptron 115, and the learning rate may be selected, at design time, to cause the values of the weights to converge to steady state in reasonably few iterations, without instability in the convergence process.

Figure 2D:
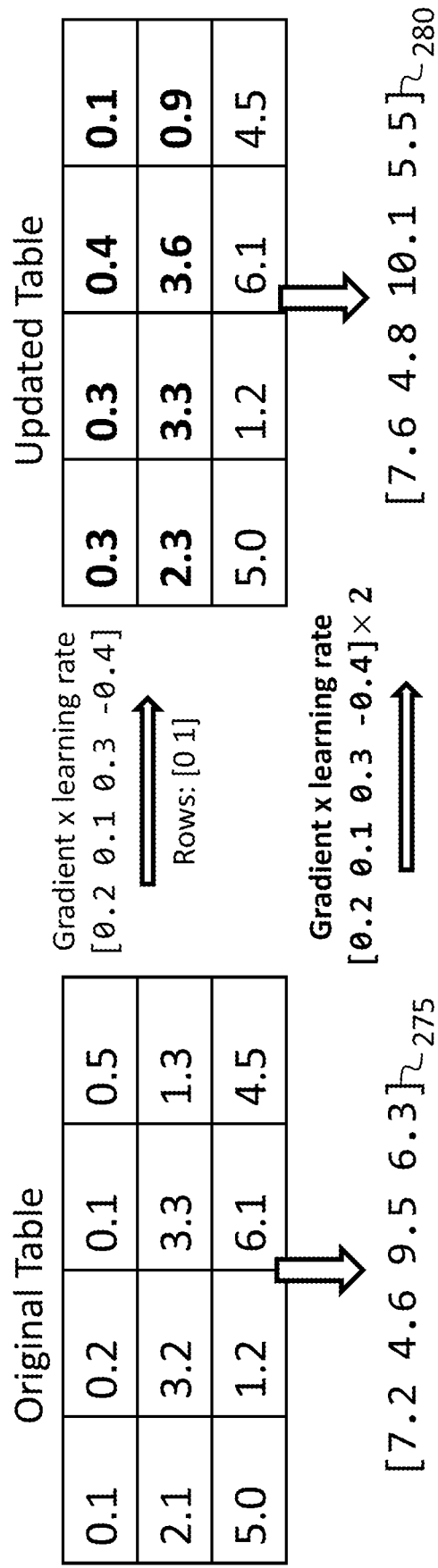
FIG. 2D is a numerical example of speculative recovery, according to an embodiment of the present disclosure.

In some embodiments, embedded vectors are calculated based on old rows, and a process (which may be referred to as "speculative recovery") is then used to correct the vectors for the difference between the old rows and the updated rows. For example, an embedded vector that was formed by summing a set of rows of the old embedding table may have added to it N times the product of the gradient and the learning rate (where N is the number of indices common to the current input feature vector and the previous batch of input feature vectors), to form the embedded vector that would have been obtained had the same set of rows of the updated embedding table been summed. This process may make it possible to calculate embedded vectors in an iteration without waiting for the updating of the embedding table to be completed, resulting in a shorter processing time, as discussed in further detail below. FIG. 2D shows an example of this process, in which the first two rows of the embedding table were among the rows added, in both the previous iteration and the present iteration, to form the embedded vectors in those iterations. The product of the gradient and the learning rate is multiplied by the number of indices common to both the current input feature vector and the previous batch of input feature vectors (because only the rows of the embedding table corresponding to the previous batch of input feature vectors are updated, and only the rows of the embedding table corresponding to the current input feature vector are used to calculate the current embedded vector) and this product is added to the "outstanding" embedded vector 275 (the embedded vector calculated based on the old (or "Original") embedding table) to calculate the embedded vector 280 that would have been obtained had the embedding table been updated before the calculating of the embedded vector.

Figure 2E:
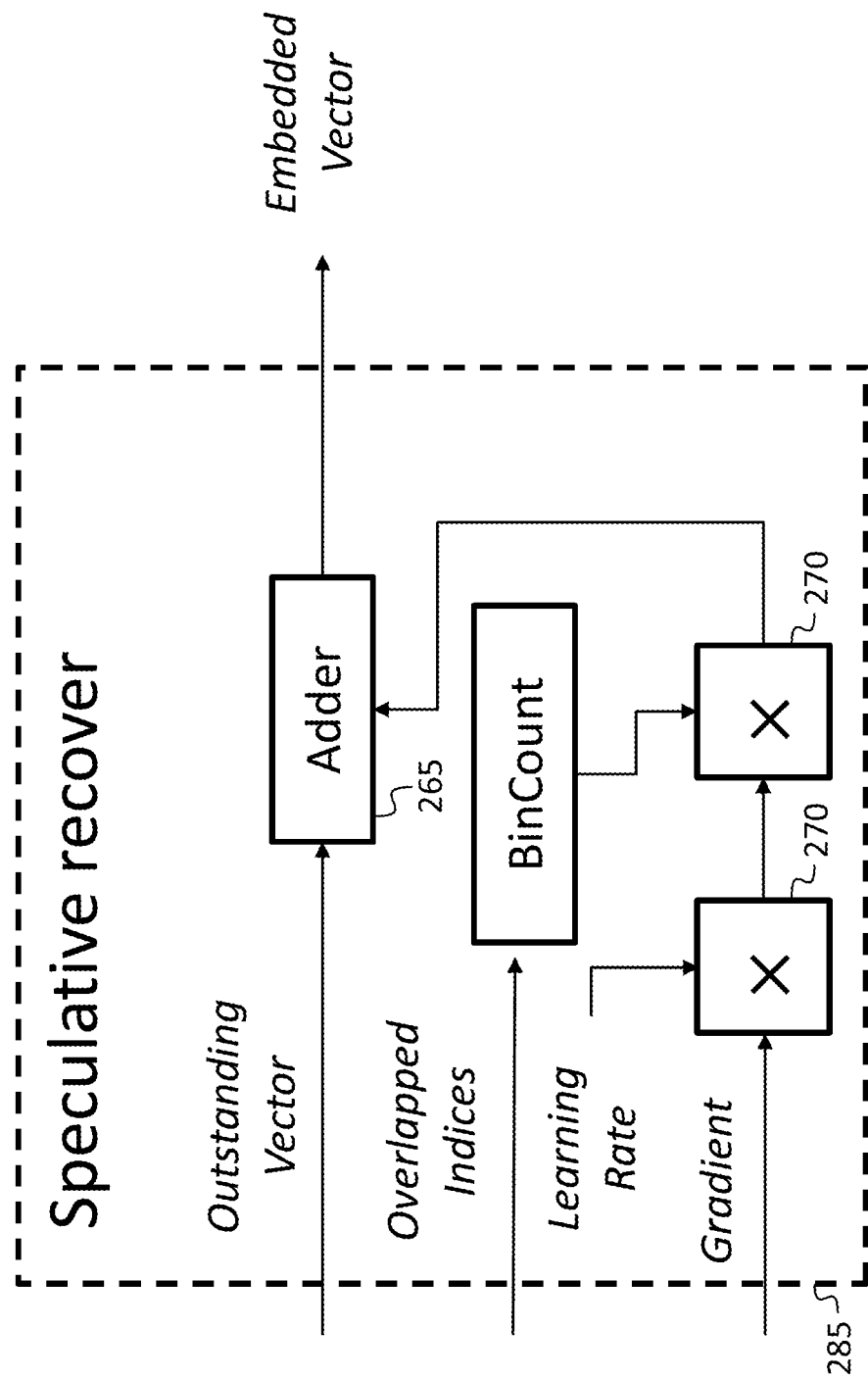
FIG. 2E is a block diagram of a speculative recovery circuit, according to an embodiment of the present disclosure.

FIG. 2E shows a speculative recovery circuit that may be used to perform this updating. The gradient, the learning rate, and the number (binCount) of indices common to both the current input feature vector and the previous batch of input feature vectors are multiplied together in the multipliers 270 and added, in the adder 265, to the outstanding vector to form the updated embedded vector.

Referring again to FIG. 2B, in the embedding kernel this process is accomplished by the speculative recovery circuit 285 and the updated embedded vectors are written to the exposed portion 190 of the level 2 cache 175 of the computational storage device 170 (where they may be read by the GPU system 125) by a vector writing circuit 290, which also writes the updated rows to the level 2 cache 175 or to the backing store 185. The crossbar selection logic (implemented in the switching controller 210) may always prioritize the rows from the gradient updater. Rows of the embedding table may be forwarded back to the input of the cross-bar switch 205 if there are overlapped indices between the current and the previous input feature vectors. The crossbar selection logic may also prefetch the rows for future inputs when there is available space in a vector buffer 235.

Figure 3:
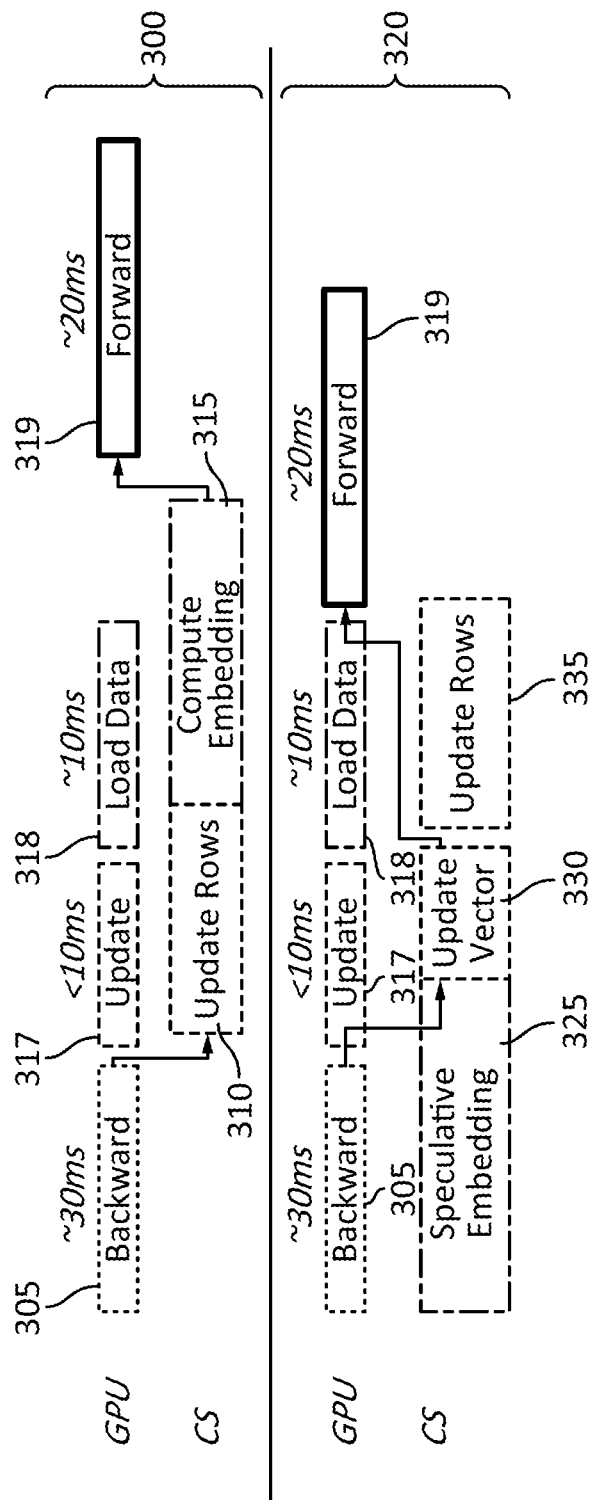
FIG. 3 is a processing flow diagram showing two processing flows, according to an embodiment of the present disclosure.

FIG. 3 shows a first processing flow 300, which involves waiting until the embedding table has been updated before beginning the calculation, for the next iteration, of embedded vectors. After the GPU system completes a backward pass at 305, the computational storage system 130 updates the rows at 310 and then computes the embedded vectors at 315. The parameters are also updated, at 317, and the current batch of training data is preprocessed and sent to the GPU (in a "Load Data" step) at 318. An inference (forward pass) of the model is then performed at 319. FIG. 3 also shows a second processing flow 320, in which speculative embedding is performed at 325 to calculate outstanding embedded vectors, which are updated at 330. The rows are then updated at 335. It may be seen that the second processing flow 320 may be completed about 5 ms more quickly than the first processing flow 300.

Figure 4:
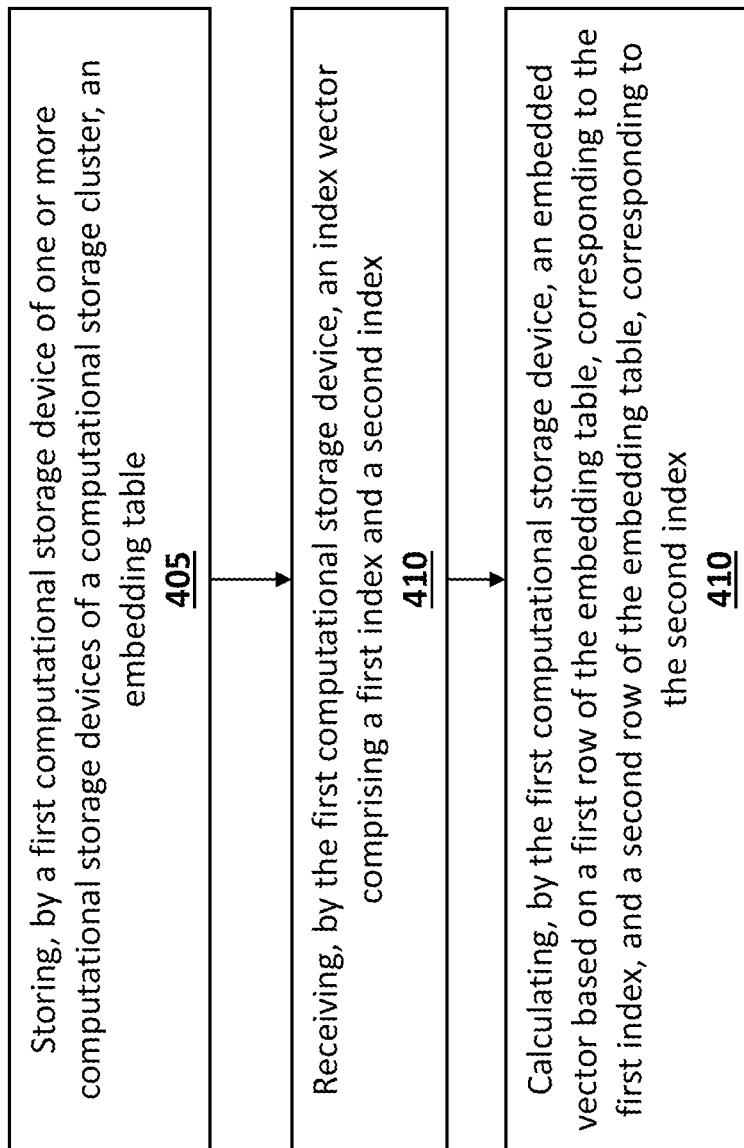
FIG. 4 is a flow chart of a first method, according to an embodiment of the present disclosure.

FIG. 4 is a flowchart of a first method, in some embodiments. The method includes storing, at 405, by a first computational storage device of one or more computational storage devices of a computational storage system, an embedding table; receiving, at 410, by the first computational storage device, an index vector comprising a first index and a second index; and calculating, at 415, by the first computational storage device, an embedded vector based on: a first row of the embedding table, corresponding to the first index, and a second row of the embedding table, corresponding to the second index. The computational storage system may be connected to a graphics processing unit cluster by a cache-coherent system interconnect, and the graphics processing unit cluster may include one or more graphics processing units.

Figure 5:
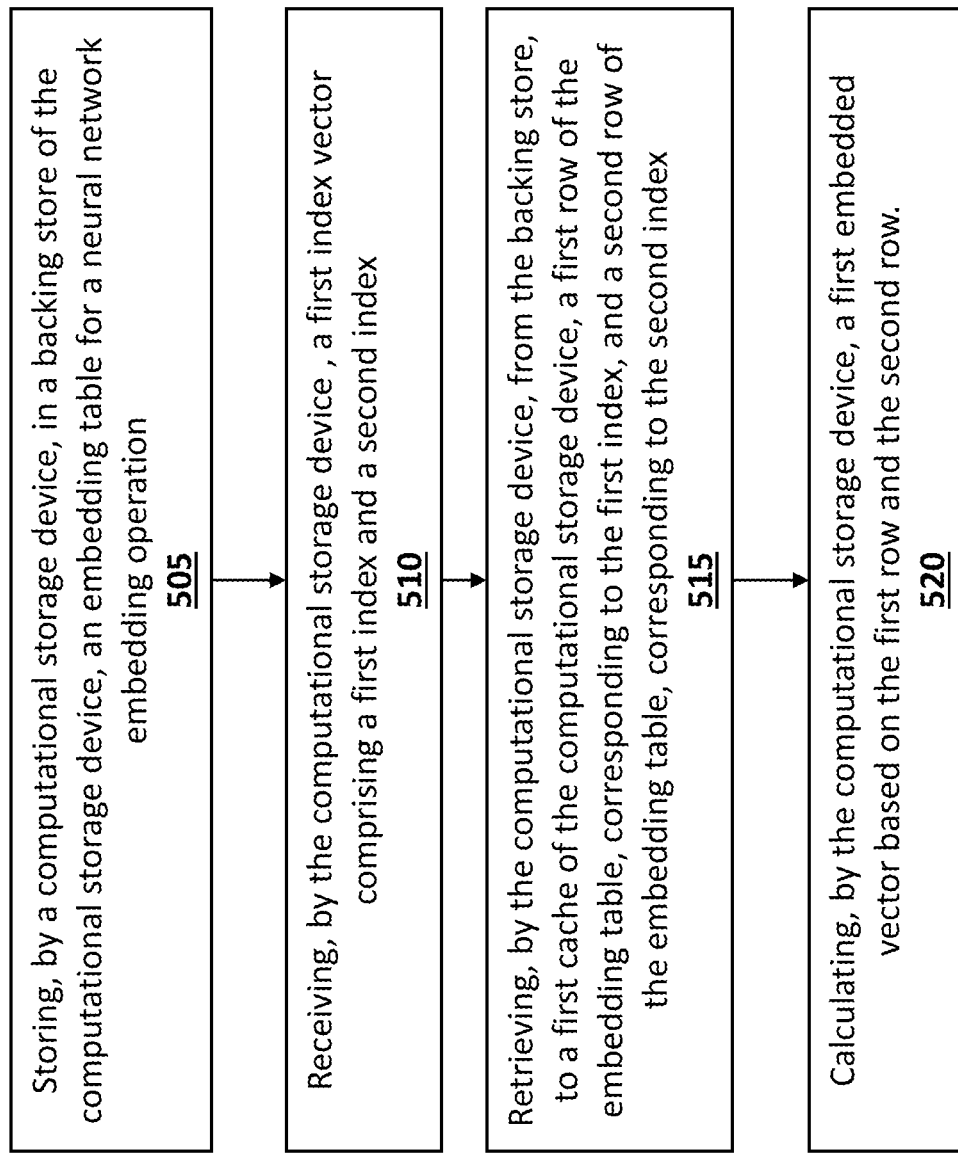
FIG. 5 is a flow chart of a second method, according to an embodiment of the present disclosure.

FIG. 5 is a flowchart of a second method, in some embodiments. The method includes storing, at 505, by a computational storage device, in a backing store of the computational storage device, an embedding table for a neural network embedding operation; receiving, at 510, by the computational storage device, a first index vector comprising a first index and a second index; retrieving, at 515, by the computational storage device, from the backing store, to a first cache of the computational storage device: a first row of the embedding table, corresponding to the first index, and a second row of the embedding table, corresponding to the second index; and calculating, by the computational storage device, a first embedded vector based on the first row and the second row.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

One or more processing circuits may perform the methods described herein, and, for example, the controller 180 of any of the computational storage devices 170 may be (or include) a processing circuit. The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for training a neural network have been specifically described and illustrated herein, many modifications and variations will be apparent to those skilled in the art. Accordingly, it is to be understood that a system and method for training a neural network constructed according to principles of this disclosure may be embodied other than as specifically described herein. The invention is also defined in the following claims, and equivalents thereof.

What is claimed is:
1. A system, comprising:
a computational storage device comprising a persistent storage device, a first volatile storage medium, and a second volatile storage medium,
wherein the computational storage device is configured to:
store, in the persistent storage device, an embedding table for a neural network embedding operation;
receive a first index vector comprising a first index and a second index, wherein the first index vector is associated with a first request from a computing device;
compare the first index vector against a second index vector stored in the first volatile storage medium of the computational storage device, and generate a first output and a second output, wherein the second index vector is associated with a second request from the computing device;
based on the compare, store the first index vector in the first volatile storage medium;
obtain, based on the first output, a first row of the embedding table, corresponding to the first index, from the second volatile storage medium;

retrieve, based on the second output, a second row of the embedding table, corresponding to the second index, from the persistent storage device; and calculate a first embedded vector based on the first row and the second row.

2. The system of claim 1, further comprising a graphics processing unit, wherein:

the computational storage device further comprises a memory; and the computational storage device is further configured to expose a portion of the memory for access by the graphics processing unit.

3. The system of claim 2, wherein:

the computational storage device is further configured to store the first embedded vector in the portion of the memory; and the graphics processing unit is configured to read the first embedded vector from the portion of the memory.

4. The system of claim 1, wherein the computational storage device is further configured to:

receive a gradient vector; and update a row of the embedding table based on the gradient vector to form an updated row.

5. The system of claim 4, wherein the computational storage device is further configured to update the first embedded vector, based on the gradient vector, to form an updated first embedded vector.

6. The system of claim 5, wherein the updating of the first embedded vector comprises:

calculating an overlap count, the overlap count being a count of elements present both in the first index vector and in a previous batch of index vectors.

7. The system of claim 6, wherein the calculating of the first embedded vector comprises summing the first row and the second row.

8. The system of claim 7, wherein updating of the first embedded vector further comprises adding to the first embedded vector a product of:

the overlap count,
the gradient vector, and
a learning rate.

9. The system of claim 1, wherein the second volatile storage medium includes a buffer memory.

10. A method, comprising:

storing, by a computational storage device, in a persistent storage device of the computational storage device, an embedding table for a neural network embedding operation;

receiving, by the computational storage device, a first index vector comprising a first index and a second index, wherein the first index vector is associated with a first request from a computing device;

comparing the first index vector against a second index vector stored in a first volatile storage medium of the computational storage device, and generate a first output and a second output, wherein the second index vector is associated with a second request from the computing device;

based on the comparing, storing the first index vector in the first volatile storage medium;

obtaining, based on the first output, a first row of the embedding table, corresponding to the first index, from a second volatile storage medium;

retrieving, based on the second output, a second row of the embedding table, corresponding to the second index, from the persistent storage device; and calculating, by the computational storage device, a first embedded vector based on the first row and the second row.

11. The method of claim 10, further comprising:

receiving a gradient vector; and updating a row of the embedding table based on the gradient vector to form an updated row.

12. The method of claim 11, further comprising updating the first embedded vector, based on the gradient vector, to form an updated first embedded vector.

13. The method of claim 12, wherein the updating of the first embedded vector comprises:

calculating an overlap count, the overlap count being a count of elements present both in the first index vector and in a previous batch of index vectors.

14. The method of claim 13, wherein the calculating of the first embedded vector comprises summing the first row and the second row.

15. The method of claim 14, wherein updating of the first embedded vector further comprises adding to the first embedded vector a product of:

the overlap count,
the gradient vector, and
a learning rate.

16. The method of claim 15, further comprising storing the updated first embedded vector in a cache.

17. The method of claim 13, wherein:

a second index vector comprises the first index; and
the method further comprises:
storing the first row in a cache, and
calculating a second embedded vector based on the first row.

18. The method of claim 11, further comprising storing the updated row in the persistent storage device.

19. A system, comprising:

a computational storage device comprising:
means for processing;
a first cache;
a persistent storage device;
a first volatile storage medium; and
a second volatile storage medium;

wherein the means for processing is configured to:

store, in the persistent storage device, an embedding table for a neural network embedding operation;

receive a first index vector comprising a first index and a second index, wherein the first index vector is associated with a first request from a computing device;

compare the first index vector against a second index vector stored in the first volatile storage medium, and generate a first output and a second output, wherein the second index vector is associated with a second request from the computing device;

based on the compare, store the first index vector in the first volatile storage medium;

obtain, based on the first output, a first row of the embedding table, corresponding to the first index, from the second volatile storage medium;

retrieve, based on the second output, a second row of the embedding table, corresponding to the second index, from the persistent storage device; and calculate a first embedded vector based on the first row and the second row.

20. The system of claim 19, wherein the means for processing is further configured to:

receive a gradient vector; and update a row of the embedding table based on the gradient vector.

* * * * *